United States Patent
Ochs et al.

(10) Patent No.: US 11,003,176 B2
(45) Date of Patent: May 11, 2021

(54) METHOD FOR MONITORING AN AUTOMATION SYSTEM

(71) Applicant: Enisco by Forcam GmbH, St. Leon-Rot (DE)

(72) Inventors: Ullrich Ochs, Holzgerlingen (DE); Thomas Stumpfegger, San Jose, CA (US); Fabian Häußler, Böblingen (DE)

(73) Assignee: ENISCO BY FORCAM GMBH, St. Leon-Rot (DE)

( * ) Notice: Subject to any disclaimer, the term of this patent is extended or adjusted under 35 U.S.C. 154(b) by 0 days.

(21) Appl. No.: 16/523,451

(22) Filed: Jul. 26, 2019

(65) Prior Publication Data
US 2020/0033843 A1    Jan. 30, 2020

(30) Foreign Application Priority Data

Jul. 27, 2018   (EP) .................................... 18186145

(51) Int. Cl.
*G05B 19/418*    (2006.01)
*G06T 19/20*    (2011.01)
*G05B 23/02*    (2006.01)

(52) U.S. Cl.
CPC . *G05B 19/41885* (2013.01); *G05B 19/41845* (2013.01); *G05B 23/024* (2013.01); *G05B 23/0216* (2013.01); *G06T 19/20* (2013.01)

(58) Field of Classification Search
CPC .......................... G05B 23/0216; G06T 19/20
See application file for complete search history.

(56) References Cited

U.S. PATENT DOCUMENTS

| | | |
|---|---|---|
| 6,282,455 B1 | 8/2001 | Engdahl |
| 7,817,150 B2 | 10/2010 | Reichard et al. |
| 2013/0055115 A1* | 2/2013 | Obitko ............. G05B 19/41885 715/760 |

(Continued)

FOREIGN PATENT DOCUMENTS

EP    2320296 A1    11/2011

*Primary Examiner* — Phi Hoang
(74) *Attorney, Agent, or Firm* — Michael T. Abramson; Holland & Knight LLP (57) ABSTRACT

A method for monitoring an automation system comprising a plurality of components, comprising: rendering, by a processor, an image from a three-dimensional scene representing at least part of the automation system on the basis of position data and viewing direction data, and displaying the image on a display unit shall make it possible to monitor the automation system on a comparatively small display device while displaying all relevant information. To that end, the components are distributed over a plurality of floors of the automation system and the components are arranged in the three-dimensional scene on one of said floors, respectively, an input element associated with the floors is provided, wherein a vertical distance between two adjacent floors in the three-dimensional scene is changed depending on an input at the input element, and wherein material paths between components of the automation system are represented as lines in the scene, wherein at least one line represents a material path between said adjacent floors, and wherein when the vertical distance between said two adjacent floors in the three-dimensional scene is changed, the length of the line is also changed accordingly.

14 Claims, 10 Drawing Sheets

(56) References Cited

U.S. PATENT DOCUMENTS

| | | | |
|---|---|---|---|
| 2014/0095244 A1* | 4/2014 | Sagraves | G06Q 10/087 |
| | | | 705/7.24 |
| 2014/0245232 A1 | 8/2014 | Bailiang | |
| 2014/0380177 A1* | 12/2014 | Gutermuth | G06F 3/0482 |
| | | | 715/736 |
| 2017/0098309 A1* | 4/2017 | Michel | G06T 7/75 |
| 2017/0315696 A1 | 11/2017 | Jacobson et al. | |
| 2018/0130260 A1* | 5/2018 | Schmirler | G06Q 10/0633 |
| 2019/0018569 A1* | 1/2019 | Andreae | G02B 27/017 |

* cited by examiner

METHOD FOR MONITORING AN AUTOMATION SYSTEM

CROSS-REFERENCE TO RELATED APPLICATION

The subject application claims the priority of European Patent Application No. 18186145.1, filed on 27 Jul. 2018, the contents of which are herein incorporated by reference in its entirety.

The invention relates to a method for monitoring an automation system with a plurality of components, comprising: rendering, by a processor, an image from a three-dimensional scene representing at least part of the automation system on the basis of position data and viewing direction data, and displaying the image on a display unit. It also relates to a computer program product and a control system.

Automation systems are industrial plants in which production and processing steps are fully or partially automated. Depending on the type of products manufactured or processed, an automation system can be highly individually designed. As a rule, however, it consists of processing stations to which the products to be processed or their preliminary stages are brought by means of a conveyor system in a certain sequence and processed there. The conveyor system includes various well-known conveyor elements such as elevators, conveyor belts, etc. They can either be taken to the processing station and removed and processed there, or they can be conveyed continuously through a processing station and processed on the respective conveyor element during this process. Processing stations and conveying equipment form the components of the automation system. One such automation system is, for example, a painting line for motor vehicles. In this case, the processing stations are stations at which a specific task is performed in the painting process, i.e. pre-treatment, application of primer, filler, base coat and clear coat. Each station is equipped with appropriate machines such as painting robots. The vehicle bodies are transported automatically from station to station by means of known conveyor elements.

The control and monitoring of an automation system is typically carried out at a control station, where the process sequences are monitored and, if necessary, influenced by corresponding data from the system with the cooperation of a user. For this purpose, a control station has one or more devices or connections to devices at the various stations of the automation system for measuring, regulating, controlling, displaying, alarming, recording, switching or calculating. The display of the process, e.g. in the form of flow diagrams, is usually carried out via various display units such as screens. Recently, the emergence of mobile devices such as tablets and laptops has also made it possible to display and control processes on such mobile devices, allowing the user to move freely within the automation system. It is also possible to carry out remote monitoring of the plant so that the control station or mobile device need not necessarily be located close to the automation plant.

For the most part, automation systems are currently shown on the display units by two-dimensional representations. Products and their components are often only hinted at. When three-dimensional representations are used, they are often static and show a pseudo-perspective view (often referred to as 2½-D). Such a display is often not very intuitive for the user, especially on mobile devices on-site in the plant.

Recently, therefore, automation systems have begun to be shown on the display unit in true three-dimensional form, including all machines, conveyor equipment and all products before and after assembly of all individual parts. The skilled artist is familiar with corresponding methods, for example, from U.S. Pat. Nos. 6,282,455 and 7,817,150 B2. The corresponding techniques of 3D rendering or 3D image synthesis are also known to the skilled artist. The basis for this is a data-side three-dimensional description of the components of the automation system, which is ideally true to scale. The sum of these data is called a scene. The modelling of the components and their sub-elements of the automation system within the scene is carried out by means of geometric modelling. The corresponding data is then loaded into a suitable graphics processor and there, together with position and viewing direction data, which indicate the position and viewing direction of an observer in relation to the scene, an image of the automation system or the part of the automation system in the field of vision with its components is rendered using known computer graphics methods.

The skilled artist is familiar with general (i.e. not related to automation systems) methods and systems related to 3D rendering from US 2014/0245232 A1, EP 2 320 396 A1 or US 2017/315696 A1, for example. In the area of control stations for automation systems, however, the problem arises that the information density to be displayed is immense, but on the other hand the display size of the image is limited, especially if mobile display units are to be used. Especially with larger installations it is difficult to present all information to the user on the one hand, but on the other hand not to overburden the user with possibly useless information for the current purpose. The true-to-scale three-dimensional representation also poses the problem that the view of components that are currently of interest to the user may be obscured by other components.

It is therefore the object of the invention to specify a method of the type mentioned above with which it is possible to monitor the automation system on a comparatively small display device while displaying all relevant information.

This object is solved in accordance with the invention by the fact that the components are distributed over a plurality of floors of the automation system and the components are arranged in the three-dimensional scene on one of said floors, respectively, an input element associated with the floors is provided, wherein a vertical distance between two adjacent floors in the three-dimensional scene is changed depending on an input at the input element, and wherein material paths between components of the automation system are represented as lines in the scene, wherein at least one line represents a material path between said adjacent floors, and wherein, when the vertical distance between said two adjacent floors in the three-dimensional scene is changed, the length of the line is also changed accordingly.

The invention is based on the consideration that the problem outlined above is especially considerable in the three-dimensional representation of such automation systems that are multi-floored or multi-storied in design: If, for example, the user wants to monitor components in a larger area on a lower floor, the three-dimensional representation will conceal the view of the desired area when the direction of view is from above and the position is sufficiently distant from the from above. Reducing the distance, i.e. zooming in on the desired area to avoid concealing, can be problematic, as this reduces the field of view. Information is lost in the field of view. Also a reduction of the representation to the desired floor by fading out or e.g. lateral displacement of the floor lying above can be problematic, since also here necessary information may be lost, since interactions of the interesting area with the floor above like e.g. material paths are no longer displayable. An independent representation of both floors, on the other hand, either requires additional screens or a partitioning of the existing screen, whereby due to the reduced size of each partial image, level of detail is lost. Against this background, it was recognized that a complete display without loss of detail or information on the existing screen is possible if, contrary to the true-to-scale approach usually desired in three-dimensional rendering, the vertical distance between two adjacent floors is changed in response to a user input. A suitable input element should be provided for this, which can also be implemented graphically on the display unit if necessary. This provides greater flexibility in the display, which on the one hand allows a clear view of a desired area in the three-dimensional display of the image, but on the other hand does not allow any information to be lost, e.g. with regard to the interaction of components of the automation system with components on adjacent floors.

In addition, material paths between components of the automation system are represented as lines in the scene. These lines will also be rendered in the image. Material paths here means both automated paths such as conveyor belts or lines, as well as manually operated paths such as travel paths of man-operated transport trolleys. This makes interactions between the individual components and dependencies with regard to the material flow immediately visible. If at least one line represents a material path between the adjacent floors, the length of the line is changed accordingly if the vertical distance between the two adjacent floors in the three-dimensional scene is changed. In other words, if the distance between the floors is changed in the way described above, the visibility of the material paths is maintained by extending the lines connecting the two floors to form a cross-storey material path. The term line here refers to any structure that essentially indicates a connection between two points, such as bars, cylindrical tubes or bands. The exact graphic design can therefore be different.

In an advantageous embodiment of the method, one of the floors can be selected by means of the input element and the vertical distance of the selected floor to the floor above is changed. This makes it particularly easy for the user to influence the view of an area with components of the floor relevant to him.

In a particularly advantageous embodiment of the method, the input element comprises a stationary pointer element and a section scale movable therebelow, each of the sections being associated with a floor, and a floor is selected by moving the section associated with that floor below the pointer element. Such an input element can be implemented graphically on the display, in particular, by the section scale being designed in the form of a scroll bar and, for example, consisting of vertically adjacent rectangles that form the sections that are assigned to each floor. The respective floor can be selected by moving the scroll bar with a mouse click or—on a touch-sensitive screen—with a wiping gesture.

In the methods described above, it is advantageous to increase the vertical distance between the floors compared to the true to scale distance in the real automation system, so that the view of the underlying floors is free in the three-dimensional representation.

In even more advantageous embodiments of the method, an arbitrary vertical distance is set within a given range by means of the input element. In other words, the user is given the possibility not only to decide between which adjacent floors the distance should be changed, but also how far this distance should be changed, e.g. to double or triple the true to scale distance. In the design with a section scale described above, for example, this can be achieved by determining the distance magnification measure based on the part of the section assigned to a floor the pointer element is located in.

In an even more advantageous embodiment of the method, the scene shows the current position of a material on the material paths. In other words: In the three-dimensional scene, not only the static material paths, but also information regarding the current position of materials transported on these material paths are stored, rendered and thus displayed in the image in real time. Real time means in the following that the represented processes essentially take place simultaneously with the processes miming in reality, whereby of course there will always be a certain delay with regard to signal processing and in addition only discrete information is available, e.g. with regard to the material position, so that between individual discrete information points a value for the representation (e.g. position of the material) may have to be extrapolated. Such a design is also possible independently of the changeability of the distances between the floors described above and is therefore explicitly disclosed independently of this. If, however, it is used in combination with the change in floors described above, the speed of the materials on the extended connecting lines must be increased accordingly, so that leaving one floor and arriving on the other floor remain synchronous with reality.

In a further advantageous embodiment of the method, which is also possible independently of the changeability of the distances between the floors described above and is also explicitly disclosed independently of this, the position data are automatically determined at a fixed distance from the current position of the material. In other words, the position data (and, if applicable, the viewing direction data) are not freely selected by the user, but are selected on the basis of the current position of a particular material, which may be selected by the user. Especially with continuous real-time rendering (see below), the view then follows the real-time movement of the material through the three-dimensional view of the plant.

In the following, three further advantageous embodiments of the method described above are explained. Although synergistic effects are realized in combination with the above-described design with variable distances between floors, these embodiments can also be realized independently and are herewith thus explicitly disclosed merely in connection with the generic system mentioned at the beginning.

Advantageously, the distance between parts of a component in the three-dimensional scene is increased by user input. In other words, upon user input, the three-dimensional display will show a—preferably flowing—transition to an exploded view, in which the parts of the selected component are displayed at a greater distance from each other in the rendered image. This enables the user to recognize the function and assembly of components and to determine individual parts. A smooth transition ensures orientation for the user.

Furthermore, a three-dimensional graphic is advantageously arranged in the three-dimensional scene in the region of a component, wherein the graphic contains a current representation of a two-dimensional characteristic curve of the component together with historical representations of the characteristic curve, which are arranged one behind the other in the third dimension. By using a real, three-dimensional rendered image, it is possible to enrich the components stored in the three-dimensional scene, which actually exist in the automation system, with additional, not really existing objects that represent information about the respective neighboring component, such as characteristic curves. The use of a three-dimensional environment also makes it possible to display three-dimensional graphics. In particular, this enables historical data to be displayed for typical two-dimensional characteristic curves in which current data of the respective component is stored, by arranging these in the third dimension behind the current characteristic curve.

Finally, it is advantageous to arrange a link object in the area of a component in the three-dimensional scene, whereby when the link object is selected in the rendered image, a two-dimensional view, e.g. in the form of a technical drawing, of the component is displayed. For the understanding and monitoring of some components it can be advantageous to use a conventional, two-dimensional technical drawing in addition to the three-dimensional representation. In order to make these available to the user in an easy and error-free manner, a link object is arranged in the scene and thus in the rendered image. Link object means an object in the scene which contains a link to the technical drawing and which can be activated by user input, i.e. by clicking with the mouse or touching on a touch screen. Activation then leads to the technical drawing described above.

Advantageously, the method is interactive and rendering is performed in real time. The advantage of this is that the process steps of rendering and displaying are carried out again after each change of the position data or the viewing direction data by a user input. This results in a particularly comfortable operability for the user.

A computer program product advantageously comprises software code portions that, when executed on a processor, cause the processor to perform the method described above. Such a computer program can, for example, be designed as a so-called "app" for tablet computers.

In a control system for an automation system, comprising at least one processor and a display unit, the described method is advantageously executed on the at least one processor. The processor is designed as a graphics processor into which the model data for the components are loaded, e.g. from a central processor unit. Of course, such a control system can also be distributed, several control systems can be coupled, or several processors can cooperate with each other.

Advantageously, the display unit is arranged on a mobile unit connected to the automation system and/or other components of the control system by a wireless communication link. Such a unit could be a tablet computer, for example.

The advantages achieved with the invention consist in particular in the fact that a flexible distance setting between two adjacent floors of an automation system in a 3D representation on the one hand enables a flexible and complete reproduction of information, and on the other hand for the user a clear representation on a minimum display size is generated. Through the described measures and advantageous further embodiments it is possible to display all places of interest on a suitable scale and unconcealed. The three-dimensional representation of the factory and its facilities allows a much more intuitive navigation. In addition, the described enrichment of the three-dimensional scene with additional objects such as 3D characteristics and link objects can provide additional information particularly intuitively. New employees can recognize general connections in the factory much more easily. Also for customers the traceability of the production of their product within the factory is a very welcome representation.

Embodiments of the Invention are Explained in More Detail Using Drawings, in which.

Like Parts Are Provided In All Figures With The Same Reference Signs.

Figure 1A:
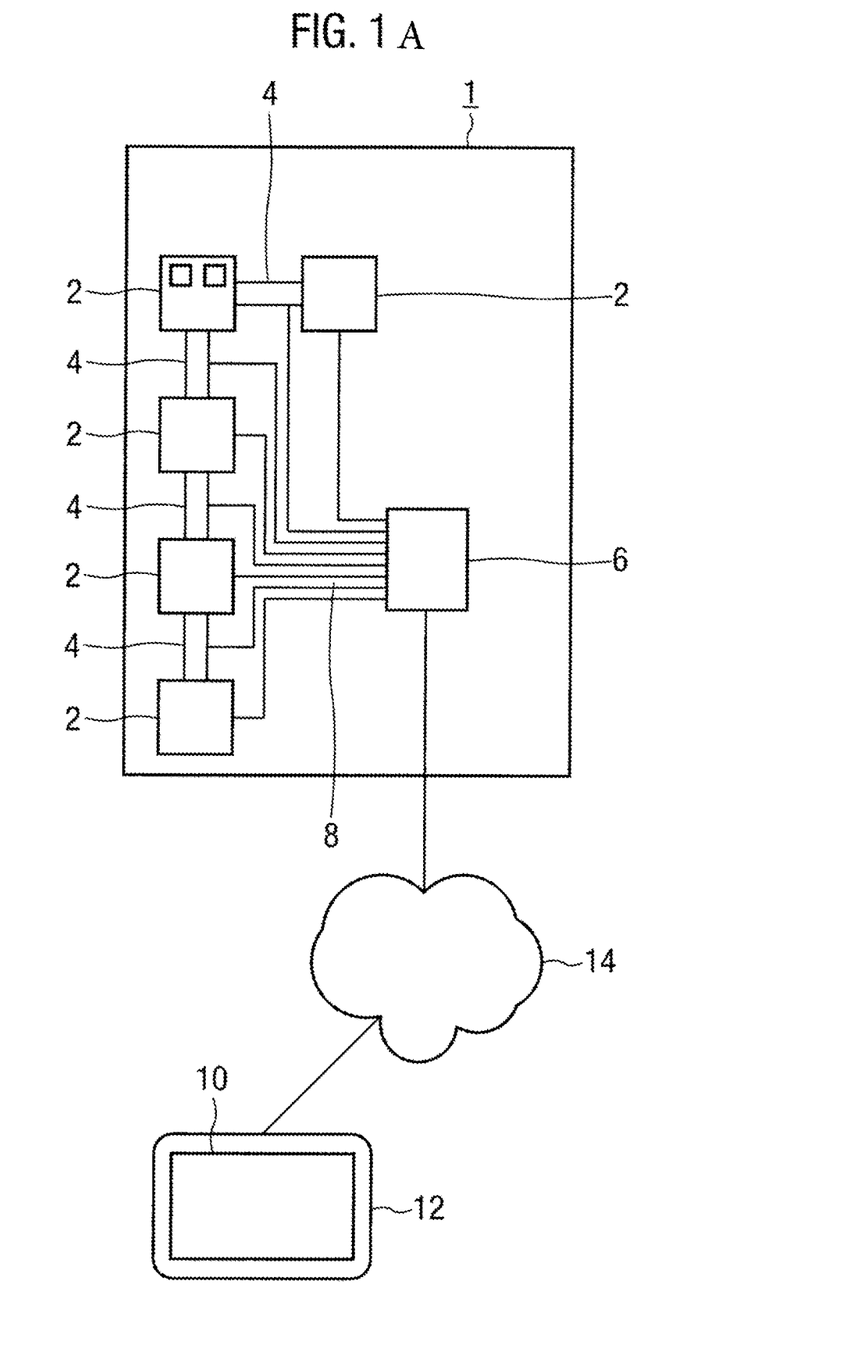
FIG. 1A shows a schematic representation of an automation system with various components and a control system with a mobile unit.

FIG. 1 shows schematically an automation plant 1, i.e. an industrial plant in which production and processing steps are automated. The industrial plant comprises a large number of components, including processing stations 2, to which the products to be processed or their preliminary stages are transported. This is done by means of conveyor devices 4 such as conveyor belts.

The control and monitoring of automation plant 1 is carried out in a control system 6, where the process sequences are monitored and, if necessary, influenced by corresponding data from automation plant 1 with the cooperation of a user. For this purpose, the control system 6 has one or more devices or data connections 8 to devices on the various components 2, 4 of the automation system 1 for measuring, regulating, controlling, displaying, alarming, registering, switching or calculating.

The display of the process takes place via a display unit 10, in the embodiment designed as a screen on a mobile unit 12, in this case a tablet computer, which as part of the control system 6 is connected to it via a wireless data connection 14. This offers the user the possibility of displaying and controlling the automation system 1 while he can move freely within the automation system 1.

On display unit 10, automation system 1 is displayed in true three-dimensional form including all components 2, 4 and all currently processed products before and after assembly. The generation of the respective image on the display unit 10 is carried out by conventional rendering techniques in a (graphics) processor in the mobile unit 12 which is not represented in detail, the rendering being carried out in real time, so that on the one hand the representation is interactive, i.e. the user can change the viewing angle and position by corresponding inputs, whereby the 3D representation immediately changes accordingly, and on the other hand a dynamic image of the automation system 1 is also possible, in which actually moving components, such as products to be processed, are also represented and also moved in real time at their respective current location. For this purpose and for all other functions described below, a corresponding software is installed in the control system 6 and the mobile unit 12.

The representation of automation plant 1 is as true to scale as possible, i.e. all components 2, 4 are represented at least schematically in their actual size and form as well as in their true to scale position and distance to each other. Deviations can be made from this—for the purpose of an improved representation—as long as it is still identifiable to the user which real component a representation corresponds to. The basis for this is a data-side three-dimensional description of the components 2, 4 of automation system 1, the so-called scene. This was generated by geometrical modelling. The corresponding model data is selected by a central processor unit and loaded into a graphics processor of the mobile unit 12. The model data can also be stored on a central server of the control system 6 and transferred to the mobile unit 12 as required. Together with the current position and viewing direction data—and depending on the performance of the graphics processor—the part of automation system 1 with its components 2 and 4 in the field of vision is then rendered by the graphics processor and displayed on the display unit 10 cyclically, ideally several times per second using known methods of computer graphics.

Figure 2A:
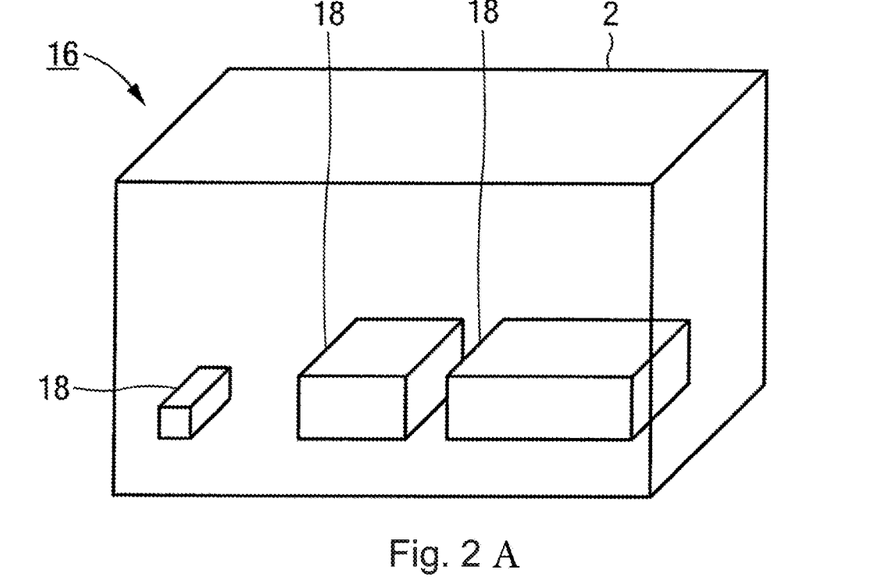
FIG. 2A shows a three-dimensional rendered image of a part of the automation system.

For example, such a rendered image 16 as shown on the display unit 10 is shown in FIG. 2. For the sake of simplicity, all components 2, 4 of automation system 1 are shown here and in the following as cuboids, but in reality they will have more complex forms. Image 16 shows a rendered representation of a processing unit 2 comprising three sub-components 18. This is the case in every automation system 1: Each processing station 2 will consist of different parts (robot arms, processing machines, etc.). These are also reproduced to a large extent to scale in the 3D representation in image 16 and are rendered by the processor. The representation of processing station 2 in FIG. 2 is semi-transparent, so that the internal subcomponents 18 are visible.

Depending on their size, automation systems 1 also have several floors. Components 2, 4 with their respective subcomponents 18 are thus distributed over several floors. A complete representation of the automation plant 1 therefore requires a representation of the floors. This results in the problem that, depending on the desired image detail or focus, parts of the automation system 1 are covered by floors above and their components 2, 4.

Figure 3:
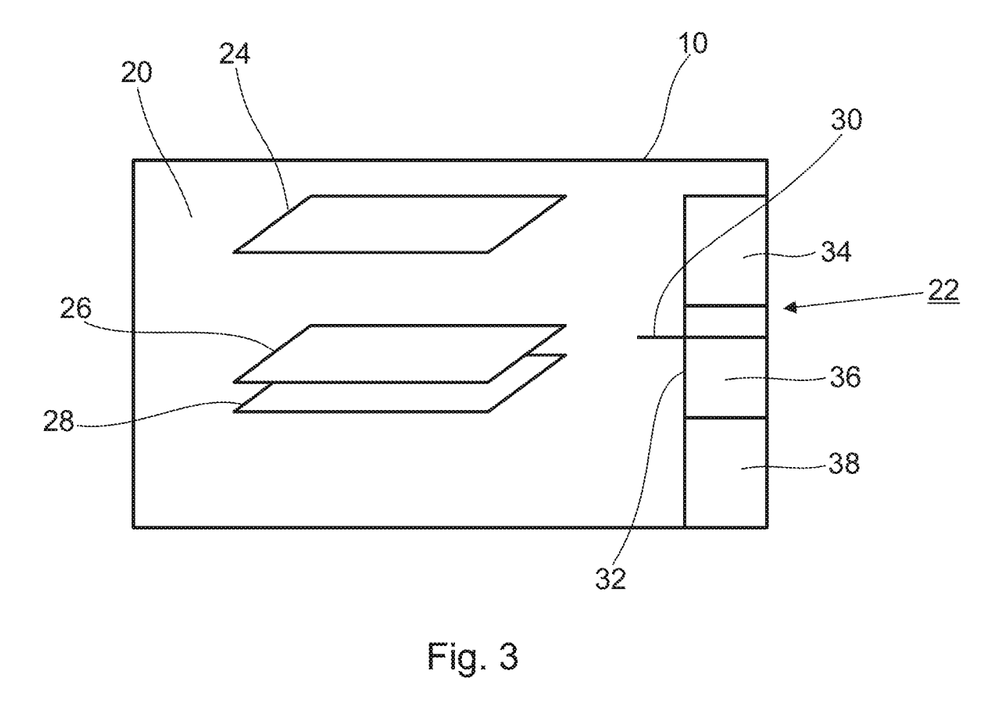
FIG. 3 shows a three-dimensional rendered image of a multi-floor automation system with variable distances between adjacent floors.

To solve this problem, the vertical distance between the floors in the scene described above will be changed as needed and used for rendering by the processor. This is shown in FIG. 3, which shows the display unit 10 with an image 20 and an input element 22. For sake of simplicity, image 20 shows only the three floors 24, 26, 28 of automation plant 1 without components 2, 4. In reality, all components 2, 4 are also shown here on floors 24, 26, 28. By means of the input element 22 the distance between the floors 24, 26, 28 can be changed as shown below.

The input element 22 is arranged as a graphic element on the right side of the display unit 10 and comprises a central, stationary pointer element 30 and a vertically movable section scale 32 below. The display unit 1 can be designed as a touch screen so that the section scale 32 can be moved by means of a wiping gesture. The section scale 32 comprises three rectangular sections 34, 36, 38 arranged one on top of the other. Each of the sections 34, 36, 38 is assigned to a floor 24, 26, 28 in the appropriate order, i.e. the uppermost section 34 to the uppermost floor 24 and so on. By moving one of the sections 34, 36, 38 under the pointer element 30, the respectively assigned floor 24, 26, 28 is selected and the distance of the selected floor 24, 26, 28 to the overlying floor 24, 26 is increased with respect to the true to scale distance in the automation system 1. Of course, this also applies to all components 2, 4 arranged on the respective floors 24, 26, 28. The extent of this change can be determined in embodiments by the area of the respective section 34, 36, 38 in which the pointer element 30 is located. For example, the distance can become maximum if the pointer element 30 is centered in the respective section 34, 36, 38. This allows the user to set the distance as desired.

Figure 4:
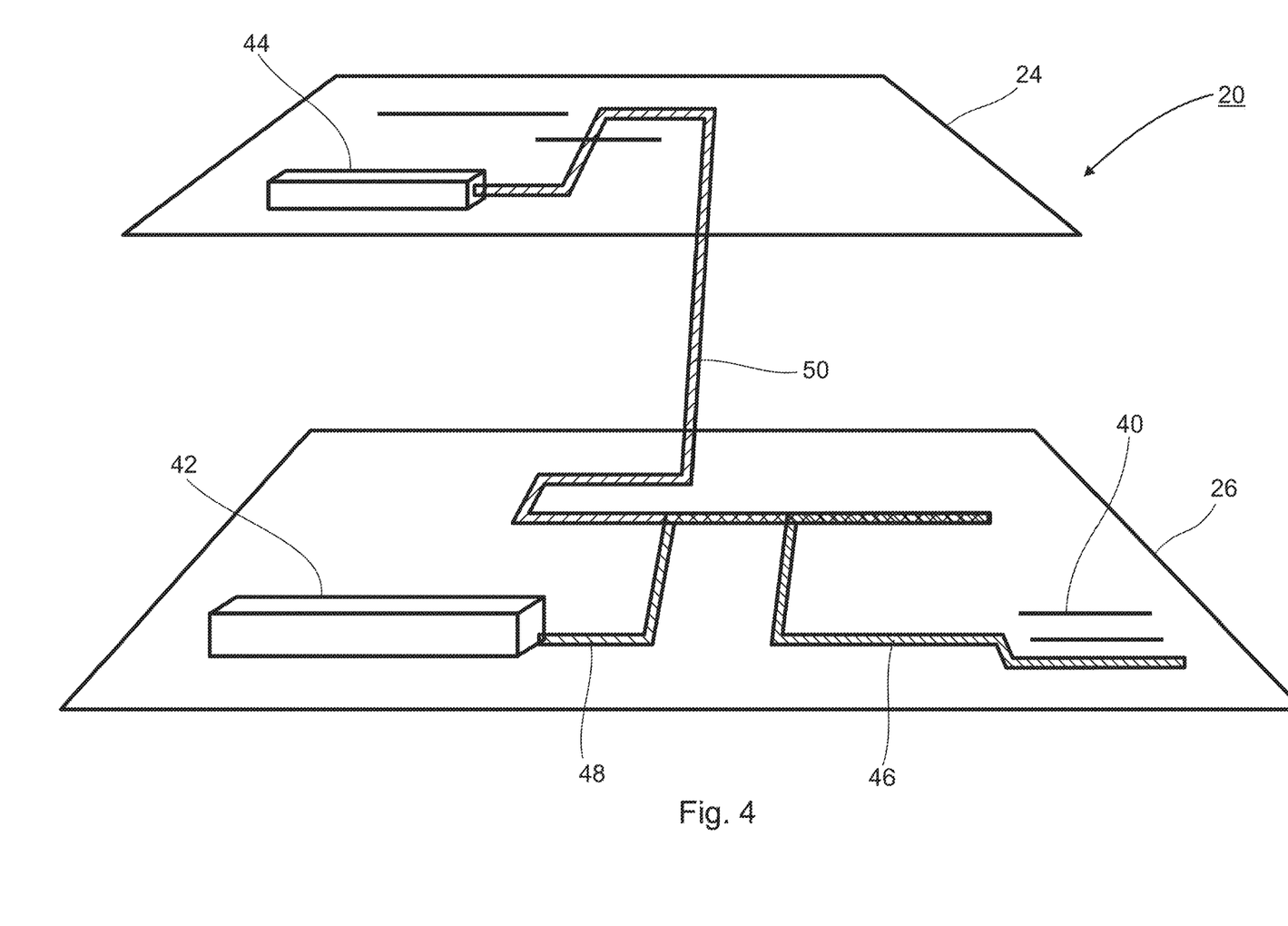
FIG. 4 shows a representation of material paths in pictures according to FIG. 3.

FIG. 4 shows image 20 in greater detail. In FIG. 4 only the two upper floors 24, 26 with some components 40, 42, 44 are shown, rendered with larger than true to scale spacing. Image 20 additionally shows material paths 46, 48, 50 as lines that indicate the path taken by certain materials of the objects produced or processed in automation system 1. If an object is made of different parts, as in the example of FIG. 4, the corresponding lines are merged. Thus the material paths 46, 48 of the components 40 and 42 flow into one material path 50. The material paths 46, 48, 50 thus represent a projection of future material movements within the automation system 1. They indicate where and when certain objects are consumed to create a new object.

The display of the material paths 46, 48, 50 can be changed. In particular, they can be graphically highlighted separately, e.g. by a color change or thickening of the lines. In addition, the material path 50 extends vertically between floors 24, 26. The corresponding line is changed accordingly when the distance between floors 24, 26 in the three-dimensional scene and the rendered image 20 is changed, so that the line always runs continuously between the two floors 24, 26.

Figure 5:
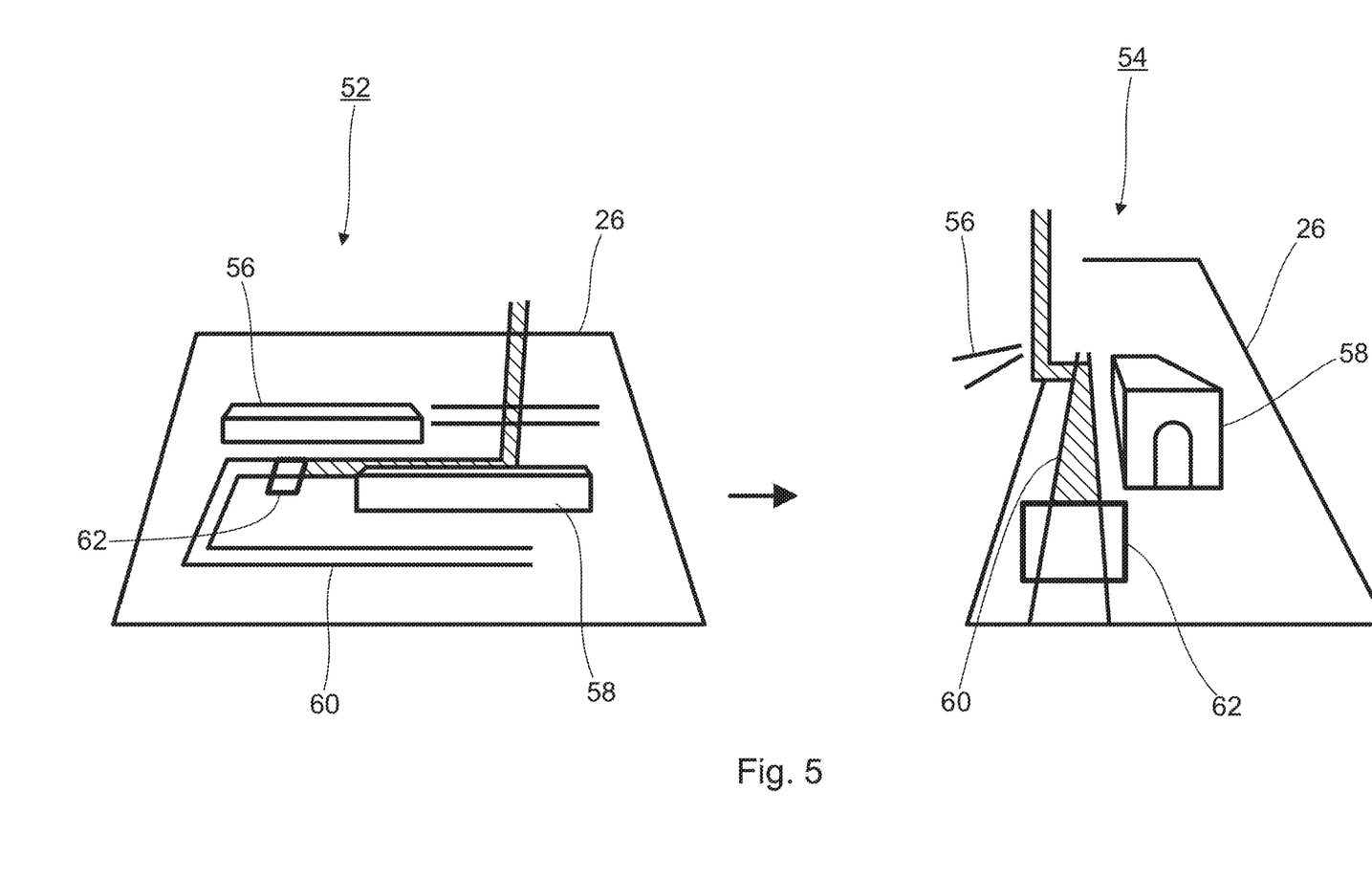
FIG. 5 shows a display of an automatic selection of position and viewing direction for rendering depending on the current position of a material in the automation system.

FIG. 5 shows two rendered images 52, 54 which are rendered from the same scene and differ in angle and position, image 52 can thus be transferred to image 54 by changing the viewing angle and position, which is indicated by an arrow between images 52 and 54. Accordingly, the individual objects in images 52 and 54 are described only once in the following. Images 52, 54 show floor 26 at a different location than in FIG. 4. Components 56, 58 and a material path 60 are shown. In contrast to the embodiment of FIG. 4, not only material path 60 is shown in FIG. 5, but also the current position of a material 62 on material path 60 is shown in real time using current data from control system 6 of automation system 1. The future path of the material 62 on the material path 60, i.e. the path currently not yet followed, is graphically highlighted separately, e.g. by a colour change or thickening of the lines.

In another embodiment, the position and viewing direction between image 52 and image 54 is not changed by a user input described above, but automatically on the basis of the position of the material 62. A fixed distance to the material 62 is taken and the viewing direction in the direction of movement of the material 62 is selected. Since the material 62 moves in real time in the image 52, 54, but the distance to it remains the same, the position and viewing direction change according to the movement of the material 62. The representation thus becomes a kind of "flight" through the automation system 1.

In the following, further aspects and characteristics of embodiments of the invention are explained. These can be combined with each other as desired and can be implemented with the features described above or without them in embodiments.

Figure 6:
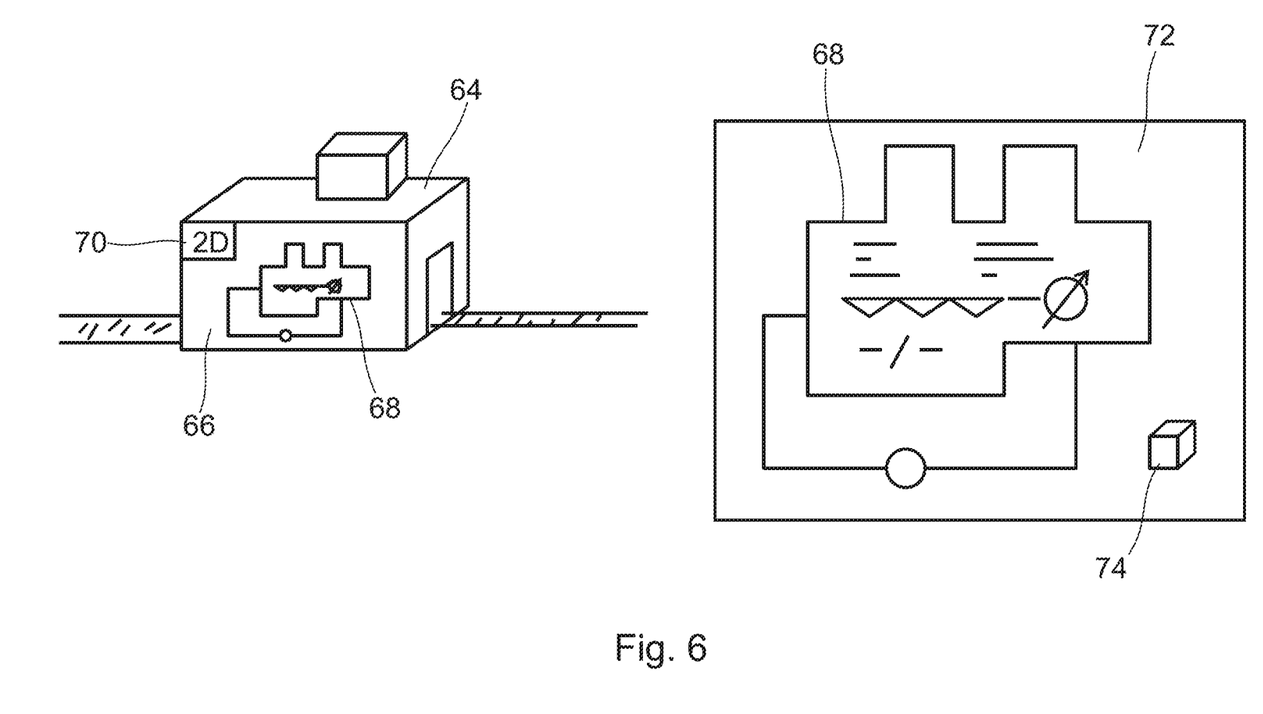
FIG. 6 shows a switch between two-dimensional and three-dimensional view.

FIG. 6 shows a section of a rendered image in the left half of the image. There a component 64 is shown. A conventional, two-dimensional representation 68 of component 64 is arranged on a surface 66 of component 64. By zooming in accordingly and setting a viewing direction perpendicular to the surface, the user can thus obtain a view in the form of a representation of component 64 known from the prior art without having to leave the three-dimensional representation. In addition, a link object 70 is arranged in the form of a button on the interface 66. This can be selected by the user, e.g. by touching a touch screen or clicking with a mouse pointer. The selection activates the two-dimensional view 72 shown in the FIG. 6 on the right side on the display unit 10. This view 72 also shows the already mentioned two-dimensional representation 68 of component 64, but as a separate representation and not embedded in the three-dimensional environment. Also in the two-dimensional view 72, a link object 74 is stored in the form of a button. By selecting this link object 74, the user can return to the three-dimensional view.

Figure 7:
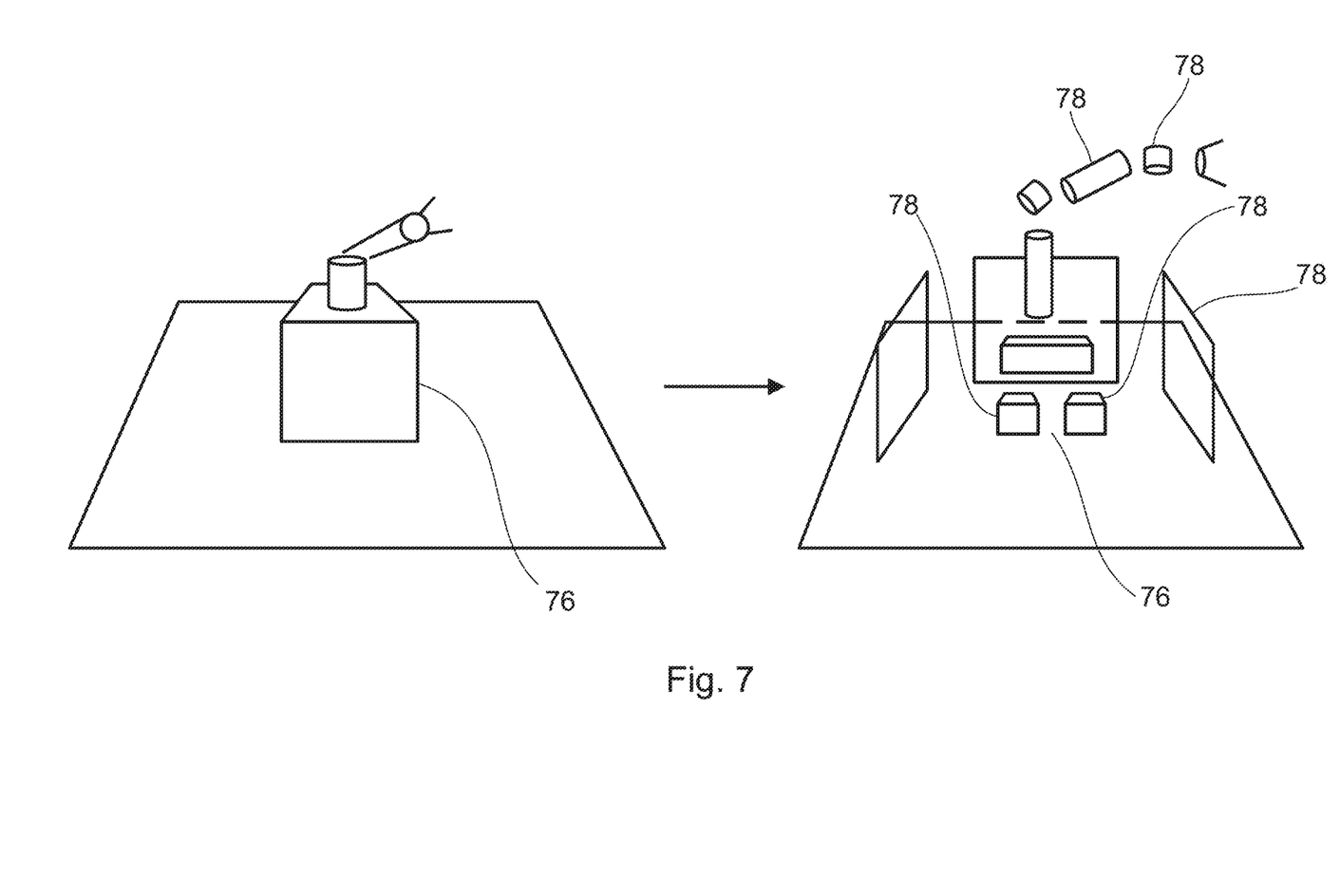
FIG. 7 shows a switch to an exploded view of a component.

FIG. 7 shows as a further feature the possibility of an exploded view within the three-dimensional environment. FIG. 7 shows a section of a rendered image in the left half of the image. A component 76 is shown here in the manner described above. Through a user interaction, e.g. via a button that is not shown in detail, the image shown in the left half of FIG. 7 is transferred to the right half, which shows an exploded view of component 76. Exploded view means that parts 78 of component 76 (not all of which in FIG. 7 are marked with the reference symbol 78 for reasons of clarity) are shown at an increased distance from each other. A smooth transition takes place between the left and the right display, i.e. the parts 78 move continuously from their original position to the position with increased distance to each other. Previously concealed parts become visible. In embodiments, parts 78 that are not essential for the function of component 76, such as covers, can be displayed transparently or completely hidden for rendering.

Figure 8:
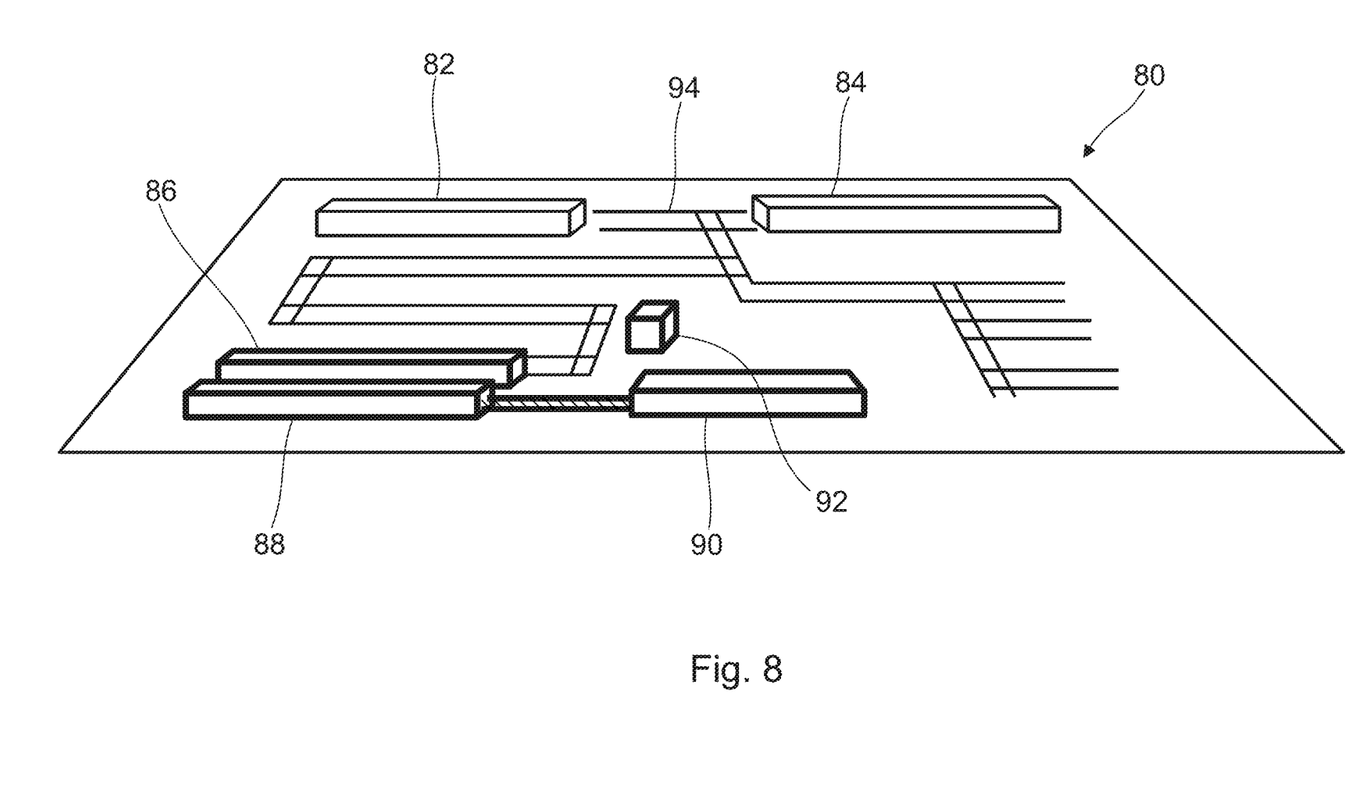
FIG. 8 shows a graphically highlighted representation of faulty components and their dependencies.

FIG. 8 shows image 80 with components 82-92 as described above and material path 94 between them. FIG. 8 shows the situation in which component 92 in automation system 1 exhibits an error. In image 80, this component 92 is graphically highlighted, in the example by a different coloring and/or flashing. At the same time, all components 86, 88, 90, which are physically or logically dependent on the faulty component 92, are graphically highlighted in the embodiment of FIG. 8, in the example also by different colors. This allows the user to see immediately which components 86, 88, 90 are affected by the failure of a component 92.

Figure 9:
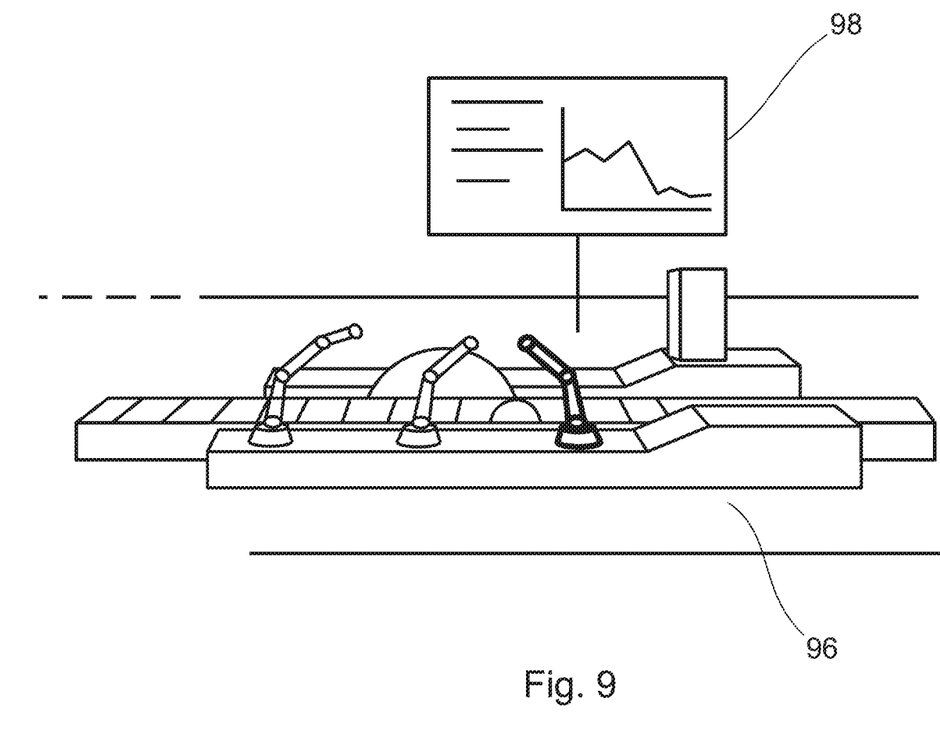
FIG. 9 shows a two-dimensional display area above a component.

FIG. 9 shows a component 96 in the three-dimensional representation already described above. In the execution example of the FIG. 9, a two-dimensional display area 98 is rendered in the three-dimensional environment above the component 96 shown. This display area 98 can, for example, contain and display diagnostic information on component 96. The information displayed on the display area 98 depends on a role held by the user. When the display unit 10 is used, roles are assigned to the user, or certain roles are assigned to a user identification. Depending on the role assigned, the information displayed on the display area 98 is adjusted.

In the embodiment according to FIG. 9, it is also possible to change the information displayed on the display area 98 after a certain expiration time, e.g. after 10 seconds. Due to the additional time component, more information can be displayed than actually fits on the display area 98. The changes can be made, for example, by scrolling, hiding and displaying or other visual effects.

Figure 10:
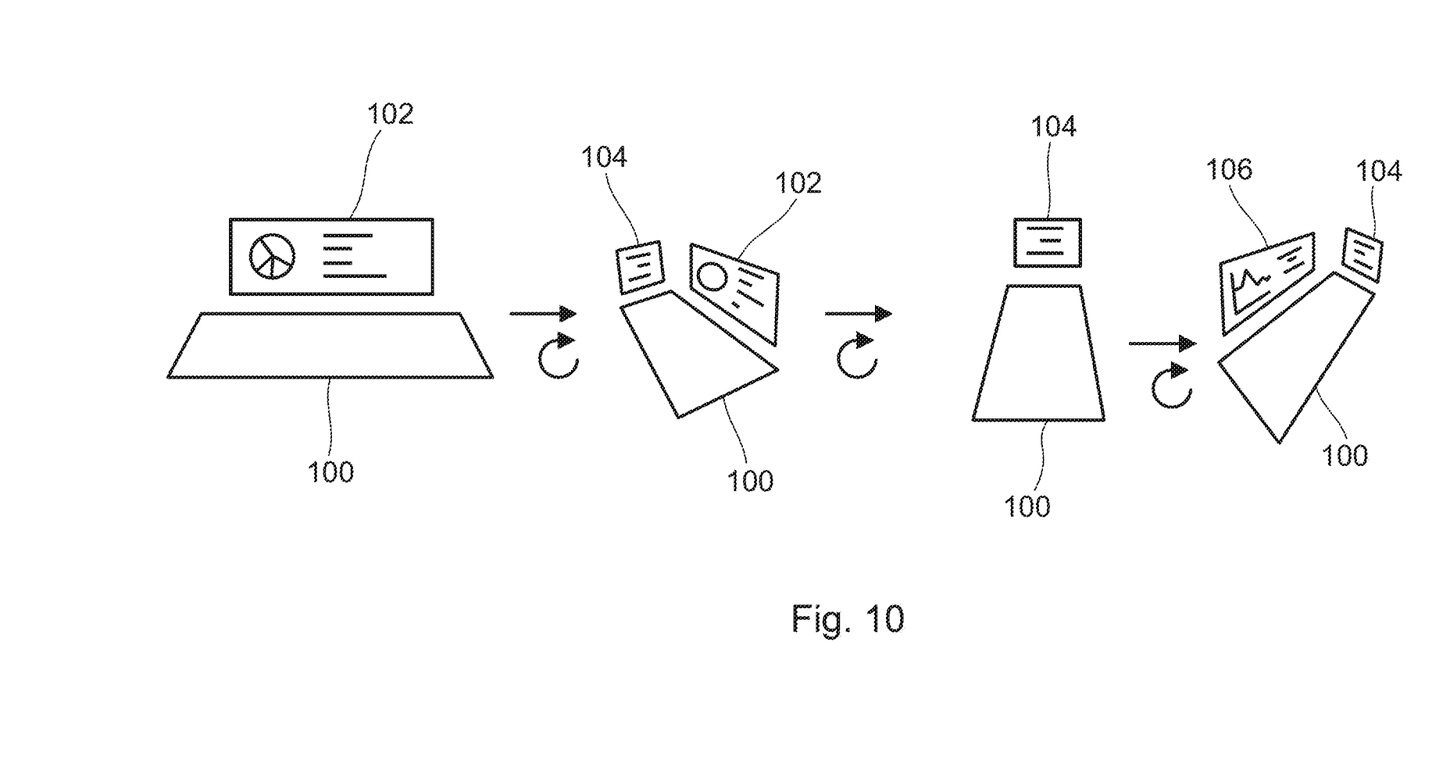
FIG. 10 shows several, partially hidden display areas above a component in different viewing directions.

FIG. 10 shows a further improvement of the display area 98 described for FIG. 9. The upper side of a component 100 is shown here. This has a rectangular surface. In the three-dimensional scene, three two-dimensional display areas 102, 104, 106 are provided over one of the edges of each rectangular area. However, these are not all displayed or rendered, but depending on the angle of view, only those display areas 102, 104, 106 are displayed in the three-dimensional display that lie behind component 100 from the user's point of view. This is shown in FIG. 10, which shows the component with the display areas 102, 104, 106 from four different viewing directions. In the first display (from left to right), in which the user looks at a long edge of component 100, only the display area 102 is displayed, which is arranged above the opposite edge. The second display is rotated 45 degrees so that the user looks at a corner. As a result, two edges of the component 100 are now in the background, so that the display areas 102, 104 above are displayed. In a similar way, the third and fourth display change with rotation.

Figure 11:
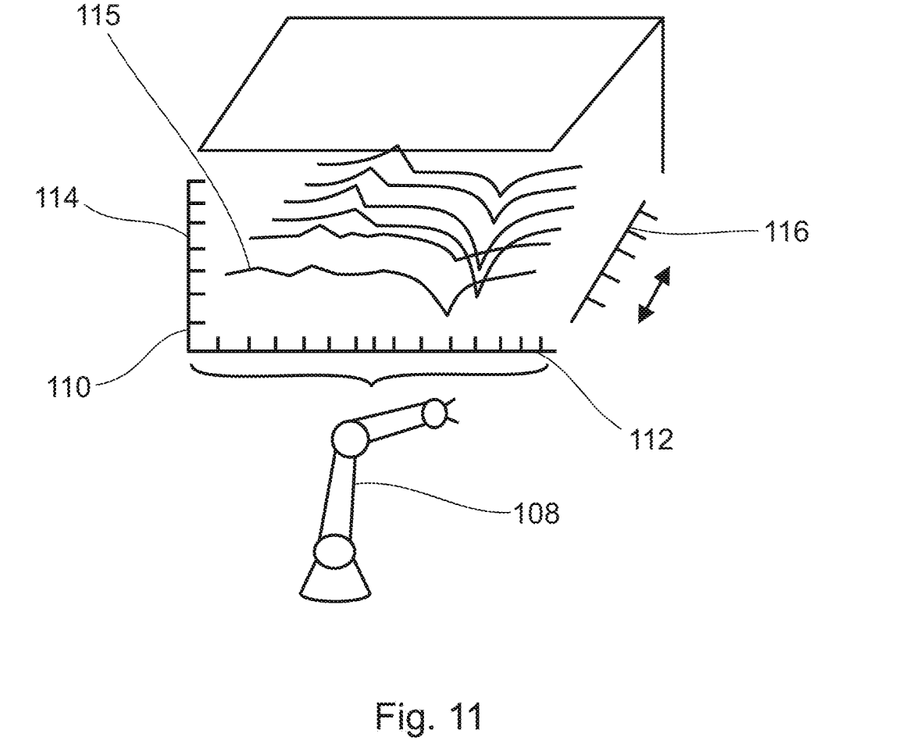
FIG. 11 shows a three-dimensional graphic over a component.

Finally, FIG. 11 shows a further possibility of additional information which can be embedded in the three-dimensional representation in individual embodiments. FIG. 11 shows a three-dimensional representation of a component 108 as already described. Above the component a three-dimensional graphic 110 is arranged in cuboid form. This has a three-dimensional coordinate grid. The x-axis 112 and the y-axis 114 form a coordinate grid in which a current characteristic curve 115 is displayed in a known manner, which is assigned to component 108. In the z-axis, on the other hand, historical representations of the characteristic curve 115 are shown at fixed time intervals, i.e. historical representations of the characteristic curve 115 are lined up behind the characteristic curve 115 at fixed time intervals. This provides an excellent overview of the development of multiple data points. If a large amount of historical information is available, the z-axis 116 can also be provided with a scroll bar so that browsing through the historical illustrations is possible.

In individual embodiments, the user can switch to a more detailed two-dimensional view by selecting specific data series. A comparison view in which two or more historical curves are compared with each other or with a reference curve is also conceivable. The reference curve can be generated from measured or modelled simulation values.

In the three-dimensional graphic 110 described above, a distinction can be made between a real value mode and a deviation mode with regard to the historical characteristic curves. In real value mode, the absolute values of the respective curves are shown. In deviation mode, only deviations from the reference curve described above are displayed for each characteristic curve. This makes deviations easily visible due to corresponding peaks and can also be graphically highlighted.

As already described above, the various features described can be combined as required in different embodiments.

LIST OF REFERENCE SIGNS

1 automation system
2 processing station
4 conveying equipment
6 control system
8 data connection 10 display unit
12 mobile unit
14 wireless data connection
16 image
18 subcomponent
20 image
22 input element
24, 26, 28 floor
30 pointer element
32 section scale
34, 36, 38 section
40, 42, 44 component
46, 48, 50 material path
52, 54 image
56, 58 components
60 material path
62 material
64 component
66 surface
68 two-dimensional display
70 link object
72 two-dimensional view
74 link object
76 component
78 parts
80 image
82, 84, 86,
88, 90, 92 component
94 material path
96 component
98 two-dimensional display area
100 component
102, 104,
106 two-dimensional display area
108 component
110 three-dimensional graphics
112 x-axis
114 y-axis
115 characteristic curve
116 z-axis

The invention claimed is:

1. A method for monitoring an automation system comprising a plurality of components, comprising:
rendering, by a processor, an image from a three-dimensional scene representing at least part of the automation system on the basis of position data and viewing direction data, displaying the image on a display unit, characterized in that the components are distributed over a plurality of floors of the automation system and the components are arranged in the three-dimensional scene on one of said floors, respectively, an input element associated with the floors is provided, wherein a vertical distance between two adjacent floors in the three-dimensional scene is changed depending on an input at the input element, and wherein material paths between components of the automation system are represented as lines in the scene, wherein at least one line represents a material path between said adjacent floors, and wherein when the vertical distance between said two adjacent floors in the three-dimensional scene is changed, the length of the line is also changed accordingly.

2. The method according to claim 1, wherein one of the floors can be selected by means of the input element and the vertical distance of the selected floor to the floor lying above it is changed.

3. The method according to claim 2, wherein the input element comprises a stationary pointer element and a section scale movable therebelow, wherein a floor is associated with each of the sections, and a floor is selected by moving the section associated with that floor below the pointer element.

4. The method according to claim 2, wherein the vertical distance is increased in relation to the true to scale distance.

5. The method according to claim 1, wherein an arbitrary vertical distance is set within a predetermined range by means of the input element.

6. The method according to claim 1, wherein the current position of a material on the material paths is represented in the scene.

7. The method according to claim 1, wherein the position data is automatically determined at a fixed distance from the current position of the material.

8. The method according to claim 1, wherein, upon user input, the distance between parts of a component in the three-dimensional scene is increased.

9. The method according to claim 1, wherein a three-dimensional graphic is arranged in the three-dimensional scene in the region of a component, wherein the graphic includes a current representation of a two-dimensional characteristic curve of the component together with historical representations of the characteristic curve arranged one behind the other in the third dimension.

10. The method according to claim 1, wherein a link object is arranged in the three-dimensional scene in the region of a component, wherein when the link object is selected in the rendered image, a two-dimensional view of the component is displayed.

11. The method according to claim 1, wherein the method steps of rendering and displaying are carried out again after each change of the position data or the viewing direction data by a user input.

12. A computer program product residing on a non-transitory computer readable storage medium comprising software code portions stored thereon which, when executed on a processor, cause the processor to execute the method according to claim 1.

13. A Control system for an automation system, comprising a processor and a display unit, the method according to claim 1 being executed on the processor.

14. The control system according to claim 13, whose display unit is arranged on a mobile unit connected to the automation system and/or further components of the control system by a wireless communication link.

* * * * *